United States Patent
Sinha et al.

(10) Patent No.: US 7,326,432 B2
(45) Date of Patent: Feb. 5, 2008

(54) PROCESS FOR CONVERTING BRINED SWEET CHERRIES INTO SWEETENED DRIED RED TART CHERRY-LIKE PRODUCTS AND STABILIZED BLACK CHERRY-LIKE PRODUCTS

(75) Inventors: Nirmal K. Sinha, Frankfort, MI (US); Meena Sinha, Frankfort, MI (US); Danielle J. Starlin, Frankfort, MI (US)

(73) Assignee: Graceland Fruit, Inc., Frankfort, MI (US)

( * ) Notice: Subject to any disclaimer, the term of this patent is extended or adjusted under 35 U.S.C. 154(b) by 563 days.

(21) Appl. No.: 10/624,225

(22) Filed: Jul. 22, 2003

(65) Prior Publication Data

US 2005/0019477 A1    Jan. 27, 2005

(51) Int. Cl.
*A23L 1/212* (2006.01)
(52) U.S. Cl. .................. 426/639; 426/524; 426/615
(58) Field of Classification Search ............... 426/639, 426/615, 524
See application file for complete search history.

(56) References Cited

U.S. PATENT DOCUMENTS

| | | | |
|---|---|---|---|
| 2,788,281 A | 4/1957 | Guadagni | |
| 3,800,049 A | 3/1974 | Larroche et al. | |
| 4,115,595 A | 9/1978 | Jordan | |
| 4,350,711 A | 9/1982 | Kahn et al. | |
| 4,788,072 A | 11/1988 | Kawamura | |
| 5,019,405 A | 5/1991 | Sapers | |
| H1014 H * | 1/1992 | Kraut et al. | 426/250 |
| 5,277,922 A * | 1/1994 | Rejimbal et al. | 426/333 |
| 5,525,365 A | 6/1996 | Elankovan | |
| 6,159,527 A | 12/2000 | Wettlaufer | |
| 6,254,919 B1 | 7/2001 | Phillips | |
| 6,479,092 B1 | 11/2002 | Wettlaufer | |

FOREIGN PATENT DOCUMENTS

| | | |
|---|---|---|
| FR | 2730606 | 8/1996 |
| JP | 57054553 | 4/1982 |
| JP | 60078536 | 5/1985 |

OTHER PUBLICATIONS

G.M. Sapers, Color Characteristics and Stability of Non-Bleeding Cocktail Cherries Dyed with Carotenoid Pigments, J. Food Science, vol. 59. No. 1 pp. 135-138, 1994.

Warner, et al., An Update on Regulatory Status and Methodologies, Food and Testing Analysis, vol. 6, No. 4 pp. 8-14, Aug./Sep. 2000.

* cited by examiner

*Primary Examiner*—Helen Pratt
(74) *Attorney, Agent, or Firm*—Price, Heneveld, Cooper, DeWitt & Litton, LLP

(57) ABSTRACT

The invention typically includes value-added fruit products and processes for making value-added fruit products by providing brined cherries, optionally freezing the cherries in water for about 12 to about 72 hours, rinsing the cherries to remove sulfur to less than 50 ppm, and infusing the brined cherries. Typically, the processed products comprise less than 10 ppm sulfur.

24 Claims, No Drawings

PROCESS FOR CONVERTING BRINED SWEET CHERRIES INTO SWEETENED DRIED RED TART CHERRY-LIKE PRODUCTS AND STABILIZED BLACK CHERRY-LIKE PRODUCTS

BACKGROUND OF THE INVENTION

The present invention generally involves a process for producing a value-added fruit product from another, less valuable and less useful, starting fruit or fruit material and the products produced by the processes.

Occasionally, fruits are processed for incorporation into base products such as fruit flavored, fruit based, or fruit containing edible products. Such products include candies, ice creams, fruitcakes, jams, jellies, etc. One of the most common processing techniques for converting fruits into such base products begins with subjecting the fruit, such as a cherry, to a brine solution. Brine solutions typically include water that is saturated or strongly impregnated with calcium salt and sulfur dioxide. The fruit is generally placed in a brine solution to steep for a period of time. Brined fruit, such as cherries, are inexpensive and generally in plentiful supply, but are generally not useful for the same applications as are sweetened, dried red tart cherries or black cherry products.

Therefore, a need exists for a simple and economical process for converting fruits, in particular, brined cherries, into other more value-added fruit products such as red tart cherry-like products and stabilized black cherry-like products where the converted products are pleasant tasting and safe for human or animal consumption.

Previous processes attempting to achieve this result are time consuming and cumbersome and do not offer the full functionality achieved by the processes of the present invention. The traditional processes that attempt to manufacture value-added products using brined base products usually take several weeks, and the resulting products may contain high levels of sulfur.

SUMMARY OF THE INVENTION

One aspect of the present invention includes a process for making a value-added fruit product by providing brined cherries, freezing the cherries in water, rinsing the cherries to remove sulfur to less than 50 ppm, coloring and infusing the cherries using the liquid bath, stabilizing the cherries by increasing the Brix of the cherries, pasteurizing the cherries by heating and then cooling the cherries, adding a flavorant to the liquid bath as the cherries cool during pasteurization, separating the cherries from the liquid bath, and freezing the cherries. The resulting product comprises less than about 10 ppm sulfur.

Yet another embodiment of the invention includes a process for making a value-added fruit product by providing bleached brined cherries, freezing the cherries in water, rinsing the cherries to remove sulfur to less than about 50 ppm, infusing and drying. The resulting product comprises less than about 10 ppm sulfur.

These and other features, advantages, and objects of the present invention will be further understood and appreciated by those skilled in the art by reference to the following specification and claims.

DETAILED DESCRIPTION OF PREFERRED EMBODIMENT

The present invention goes well beyond prior art technology in both the nature and use of converting lesser-valued fruit products into value-added fruit products. More particularly, converting brined cherries to sweet cherries into value-added cherry products.

In one embodiment, the process of the present invention may be used to convert brined cherries into sweet and dried red tart cherry-like products. This process involves providing single or double bleached, whole or sliced brined cherries, freezing the cherries in water for about 12 to about 72 hours to soften the firm tissue of the brined cherries, facilitate removal of sulfur, facilitate coloring, and aid in infusion of the cherries to a higher Brix level, rinsing the cherries to remove sulfur to less than 50 ppm, and infusing the brined cherries with cherry juice to from about 45 Brix to about 55 Brix and drying. The finished, dried, and processed cherry products typically have a sulfur content of less than about 10 ppm.

In another embodiment of the present invention, the processes of the present invention are used to convert brined sweet cherry halves into a stabilized frozen black sweet cherry product. This is typically accomplished by providing single or double bleached, whole or sliced brined cherries that are typically cut in half, freezing the cherries in water for from about 12 to about 72 hours to soften the firm tissue of the brined cherries, facilitate removal of sulfur, facilitate coloring, and aid infusion of the cherries to a higher Brix level, rinsing the cherries to remove sulfur to less than 50 ppm, coloring and infusing the cherries with a combination of red cabbage juice extract and caramel color, typically from about 1% to about 7% based upon the weight of the cherries, dissolved in corn syrup, stabilizing the cherries by increasing the Brix to not greater than about 52 Brix with a combination of high fructose corn syrup (from about 50 to about 80 Brix) and lemon juice, pasteurizing the cherries by heating and then cooling the cherries, adding a natural black sweet cherry flavor as the cherries cool, separating the cheruies from the stabilized syrup and freezing the cherries. The finished, processed cherry products typically have a sulfur content of less than about 10 ppm. The finished, processed cherries may be measured to confirm a sulfur content of less than 10 ppm.

The processes and products of the present invention provide multiple benefits and advantages, including, but not limited to, a substantially shorter process to convert the brined cherries into sweet and dried red tart cherry-like products and/or a stabilized black sweet cherry-like product. While prior art processes of converting brined cherries into other cherry products take days or weeks, the processes of the present invention only take approximately 12 hours. Additionally, the processes of the present invention are less cumbersome, involving fewer steps, easier processing methods, and less processing equipment than prior art processes.

The processes of the present invention also remove sulfur to less than about 10 ppm. Minimizing the sulfur content in the cherry-like products is desirable because people with varying degrees of sulfur allergies can typically tolerate products with less than about 10 ppm sulfur dioxide. The present invention processes have an additional advantage— they do not employ nor do the resultant inventive products contain any amount of alcohol or any artificial flavoring. Alcohol is often unwanted in a consumer's diet, especially children. Furthermore, since alcohol is flammable, use of alcohol in a manufacturing process is dangerous and might require special handling procedures to prevent accidents.

The process for converting brined sweet cherries into sweetened dried red tart cherry-like products typically utilizes single or double bleached, whole or sliced brined cherries as the starting material. Approximately 50% of all sweet cherries produced in the United States are bleached and brined in a brine solution containing 0.75% to 1.5% sulfur dioxide ($SO_2$) and 0.3%-0.5% calcium salts for up to 12 months. In the present invention, the brined cherries are frozen in water for about 12 to about 72 hours to soften the firm brined cherry texture formed due to the use of calcium salts during the brining process. As discussed earlier, freezing the brined cherries prior to coloring and infusion enhances removal of sulfur from the cherries and facilitates coloring and infusion of the cherries. The frozen brined cherries are then rinsed to remove sulfur to less than 50 ppm (parts per million). The brined cherries may first be rinsed to reduce the sulfur content to less than 50 ppm and subsequently frozen for about 12 to about 72 hours if desired. The brined cherries are infused with red tart cherry syrup containing from about 45 to about 68 Brix. The Brix value is determined by using a Brix scale, which is a hydrometer scale for sugar solutions so graduated that its reading is at a specified temperature, represents percentages of weight of sugar in a solution. The temperature during the infusion may range from about 70° F. to about 120° F.

Once infused, the brined cherries are dried. Typically the infused cherries are dried with heated air, having a temperature of from about 150° F. to about 190° F. Examples 1 and 2 show this process in greater detail. The product produced by this process typically contains a flavor and color of a sweet dried red tart cherry. The product generally has a water activity of from about 0.40 to about 0.60 and a moisture content of from about 9% to about 15%. The term 'water activity' ($a_w$) describes the (equilibrium) amount of water available for hydration of materials; a value of unity indicates pure water whereas zero indicates the total absence of water molecules. Typically, the texture of the dried product is soft, the product is shelf stable, and its red color holds very well even at ambient temperatures for several months. The total process time after the removal of the sulfur is less than 12 hours. Such a product produced by this process may be employed in snacks, for enrobing with chocolate, and in a variety of baked products.

EXAMPLE 1

Converting Brined Cherries to Sweet Dried Red Cherry-Like Products

One pound of single bleached whole brined sweet cherries of from about 20 mm to about 22 mm size initially containing about 5,500 ppm sulfur was kept in a freezer at about 0° F. and immersed in two pounds of water overnight. Subsequently, the frozen, brined, sweet cherries were rinsed with water by soaking in from about two to about four pounds of cold water. The water rinse continued until the sulfur content of the brined cherries was less than 50 ppm. This can take up to about two to about six days depending on the frequency of water replacement, amount of water, and agitation during the rinsing phase. After removing the sulfur to less than 50 ppm, the cherries were placed in a 65-68 Brix red tart cherry syrup. The acidity of this syrup was about 0.7%. The color of the coloring syrup measured by a Hunter calorimeter was the following:

L* value (black to white): 7.01
a* value (red to green): 27.50
b* value (yellow to blue): 2.88
h* value (hue angle, $\tan^{-1}$ b/a): 32.70

This approximated the color of the sweet cherry product. The temperature of the contents ranged from about 70° F. to about 120° F. The cherries were infused to about 57 Brix in about six hours. The infusion was done in two steps. After soaking for about two hours in the 68 Brix infusion syrup, the Brix of the cherries was about 38 Brix. These cherries were separated from the infusion syrup and again placed in a fresh 68 Brix infusion syrup for about four hours. Subsequently, the infused cherries were separated from the cherry syrup and dried at about 180° F. for about two hours. The water activity and the percent moisture of the dried cherries were about 0.43 and about 11.4% respectively. The Brix and percent acidity of the dried cherries were about 83.6 and about 1% respectively. The color of the dried cherries measured by a Hunter colorimeter was the following:

L* value (black to white): 28.90
a* value (red to green): 27.50
c* value (yellow to blue): 17.65
h* value (hue angle, $\tan^{-1}$ b/a): 32.70

EXAMPLE 2

Converting Brined Cherries into Stabilized Red Tart Cherry-Like Products

In this example, one half pound of brined cherry halves were previously rinsed to reduce the sulfur, generally present as sulfur dioxide ($SO_2$) content to less than about 50 ppm and were held overnight at room temperature in one pound of red tart cherry syrup. On the next day, the cherries were heated to from about 180° F. to about 200° F. and cooled. The cherries were separated from the syrup, packed in a plastic jar, and kept frozen at less than about 0° F. The Brix and pH of the processed red cherries were 52 and 3.2, respectively. The color of the final cherries measured by a Hunter colorimeter was the following:

L* value (black to white): 19.79
a* value (red to green): 26.65
b* value (yellow to blue): 16.36
h* value (hue angle, $\tan^{-1}$ b/a): 31.52

The process for converting brined sweet cherry halves to a stabilized black sweet cherry-like product includes using single or double bleached whole brined cherries, brined cherry halves or slices as the starting material. Typically, the cherries are subjected to a brine solution containing from about 0.75% to about 1.5% sulfur dioxide ($SO_2$) and from about 0.3% to about 0.5% calcium salts for up to about 12 months. The brined cherries, typically cherry halves, are then frozen with water for about 12 to about 72 hours. The brined cherry halves are typically subsequently rinsed to remove the sulfur to less than 50 ppm, but can be rinsed prior to freezing as well. Freezing the brined cherries has been found to facilitate the sulfur removal and also aids in infusing and coloring. When converting brined cherries to a stabilized black sweet cherry-like product, the brined cherries are colored by infusing the cherries with a mixture of red cabbage juice extract and caramel color dissolved in high fructose corn syrup. The temperature of the infusing red cabbage juice extract and caramel colorant bath is typically from about 70° F. to about 80° F. The cherries typically remain in this infusion bath for from about 12 hours to about 15 hours. More typically about 12 hours. Thereafter, the cherries are stabilized by infusing them using a combination of high fructose corn syrup and lemon juice, thereby increasing the Brix of the cherries to from about 25 to about 30 Brix. The brined cherries are then pasteurized by heating to a temperature of from about 180° F. to about 200° F. and subsequently cooling to a temperature of about 80° F. to about 90° F. If desired, natural black sweet cherry flavor may be added during the cooling phase of pasteurization when the temperature is typically not more than from about 100° F. to about 110° F. The cherries are then separated from the high fructose corn syrup and then frozen at a temperature less than 0° F. Examples 3-7 show this process in greater detail. The product thus created is ideally suited for use in ice cream, yogurt and other frozen products due to its ability to retain softness while not forming ice crystals and becoming hard during the freezer storage.

EXAMPLE 3

Converting Brined Cherries (Not Frozen) to a Stabilized, Frozen, Black Sweet Cherry-Like Products Using a Mixture of Red Cabbage Juice Extract and Caramel Dissolved in High Fructose (HFCS)

Six pounds of unfrozen, brined, pitted, double bleached cherries having an initial sulfur content of 4,100 ppm were sliced into halves. These cherries were placed in twelve pounds of water to remove sulfur by rinsing. The soaking water bath was changed daily. The sulfur content of cherries at the end of six days was approximately 100 ppm. The rinsed, brined cherries were divided into three groups of 0.8 lb each. Each group was placed in 0.8 lb of 50 Brix high fructose corn syrup (HFCS) containing a combination of caramel and red cabbage juice extract at about 2%, about 4% and about 6% levels each based on the weight of the cherries and held overnight at room temperature. The next day, 0.8 lb of 77 Brix HFCS (1:1 ratio based on the weight of cherries) and 0.008 lb of lemon juice concentrate (1% of the weight of cherries) were added to each set of cherries. Subsequently, each group of cherries was heated to from about 180° F. to about 200° F. and cooled. When the cherries reached about 100° F., 0.024 lb (3% based on the weight of fruit) natural sweet cherry flavor was added to each. The products were held for at least about 30 minutes in the flavor containing syrup. Subsequently, the cherries were separated from the syrup, packed in a plastic jar, and stored frozen. The Brix and pH of the cherries were about 47.6 and about 3.6, respectively. The color of the final cherries measured by a Hunter calorimeter was the following:

$L^*$ value (black to white): 14.16
$a^*$ value (red to green): 2.02
$b^*$ value (yellow to blue): 0.04
$h^*$ value (hue angle, $\tan^{-1}$ b/a): 1.12

It took three days to achieve black cherry color in the sample containing 6% each of caramel and red cabbage juice extract. Samples containing 2% and 4% each of caramel color and red cabbage juice extract did not color as well, but did provide some. Even the product containing 6% each of caramel color and red cabbage juice extract did not have as uniform a black cherry color similar to those made from frozen brined cherries. The cherries produced were slightly shriveled as well when compared to those made from frozen cherries, but were acceptable.

EXAMPLE 4

Converting Brined Cherries (Frozen with Water) into Stabilized Black Sweet Cherry-Like Products Using Red Cabbage Juice Extract and Caramel Color Dissolved in HFCS Six lbs of brined cherry halves were first frozen at less than about 0° F. overnight in 6 lb of water in a plastic pail. Subsequently, the cherries were rinsed, as in Example 3, with water to remove sulfur. After rinsing, the sulfur content of the cherries was 50 ppm. The cherries were processed further as in Example 3. In this case, it only took one day to color. The sample containing 6% each of caramel and red cabbage juice extract achieved a good black sweet cherry color. The cherries were not shriveled and had a good firm texture. The cherries' Brix and pH were about 45.6 and about 3.7, respectively. The color of the final cherries measured by a Hunter calorimeter was the following:

$L^*$ value (black to white): 13.67
$a^*$ value (red to green): 1.07
$b^*$ value (yellow to blue): −0.20
$h^*$ value (hue angle, $\tan^{-1}$ b/a): 349.54

EXAMPLE 5

Converting Brined Cherries (Frozen without Water) to Stabilized Black Sweet Cherry-Like Products Using Red Cabbage Juice Extract and Caramel Color Dissolved in HFCS Six lbs brined sweet cherry halves were frozen without water at less than about 0° F. overnight in a plastic pail. Subsequently, the cherries were rinsed with water, as in Example 1, to remove sulfur. The residual sulfur dioxide level before coloring process was about 100 ppm. These cherries were colored and processed as in Examples 3 and 4. As in Example 4, it only took one day to color the cherries with 6% of each of the colors added providing a good black sweet cherry appearance. The texture of this product was a little softer than the product of Example 4, where the cherries were frozen with water. The Brix and pH of the stabilized cherries were about 47.0 and about 3.7, respectively. The color of the final cherries measured by a Hunter colorimeter was the following:

$L^*$ value (black to white): 15.54
$a^*$ value (red to green): 1.04
$b^*$ value (yellow to blue): 0.04
$h^*$ value (hue angle, $\tan^{-1}$ b/a): 2.28

EXAMPLE 6

Converting Brined Cherry (Frozen without Water) into Stabilized Black Sweet Cherry-Like Products Using a Combination of Cranberry Syrup and Blueberry Syrup In this example, coloring and processing brined cherries into black sweet cherries was achieved using a combination of cranberry and blueberry syrup. One half pound of brined cherry halves were rinsed to reduce their sulfur dioxide content to less than about 50 ppm. The rinsed, brined cherries were held overnight at room temperature in one pound of syrup made up of 0.5 lb cranberry syrup of 67 Brix and 0.5 lb of blueberry syrup of 67 Brix. On the next day, the cherries were heated to from about 180° F. to about 200° F. and cooled. About 3% natural cherry flavor was added during the cooling phase. The cherries were separated from the syrup, packed into a plastic jar, and stored at less than 0° F. The Brix and pH of the cherries were about 40 and about 2.6, respectively. The color of the final cherries measured by a Hunter calorimeter was the following:

$L^*$ value (black to white): 5.45
$a^*$ value (red to green): 10.19
$b^*$ value (yellow to blue): 1.31
$h^*$ value (hue angle, $\tan^{-1}$ b/a): 7.34

EXAMPLE 7

Converting Brined Cherry (Frozen without Water) into Stabilized Black Sweet Cherry-Like Products Using a Combination of Cranberry Syrup and Blueberry Syrup, and Caramel Color In this example, a combination of cranberry syrup and blueberry syrup, and caramel color was used to color and process brined cherry halves. One half pound of brined cherry halves, which were previously rinsed to reduce the sulfur dioxide content to less than about 50 ppm, were held overnight at room temperature in one pound of syrup made up of about 0.45 lb cranberry syrup of about 67 Brix, 0.45 lb of blueberry syrup of about 67 Brix, and about 0.10 lb caramel color. On the next day, the cherries were heated to from about 180° F. to about 200° F. and cooled. About 3% natural cherry flavor was added during the cooling phase. The cherries were separated from the syrup, packed in a plastic jar and kept frozen. The Brix and pH of the cherries were about 47 and about 2.8, respectively. The color of the final cherries measured by a Hunter calorimeter was the following:

L* value (black to white): 3.82
a* value (red to green): 8.14
b* value (yellow to blue): 3.38
h* value (hue angle, $\tan^{-1}$ b/a): 22.57

In the foregoing description, it will be readily appreciated by those skilled in the art, that modifications may be made to the invention without departing from the concepts disclosed herein. Such modifications are to be considered as included in the following claims, unless these claims by their language expressly state otherwise.

The invention claimed is:

1. A process for making a value-added fruit product comprising the steps of:
   providing brined cherries containing sulfur;
   freezing the cherries in water for about 12 to about 72 hours;
   rinsing the cherries to remove sulfur to less than 50 ppm; and
   infusing the rinsed cherries to from about 45 Brix to about 55 Brix using an infusion bath comprising cherry juice.

2. The process of claim 1, wherein the temperature of the cherry juice is from about 70° F. to about 120° F.

3. The process of claim 2, wherein the cherry juice comprises a red tart cherry juice.

4. The process of claim 3 further comprising the step of drying the cherries.

5. The process of claim 4, wherein the product produced by the process comprises less than about 10 ppm sulfur.

6. The process of cfaim 1, wherein the product produced by the process comprises less than about 10 ppm sulfur.

7. The process of claim 1 further comprising the step of drying the cherries.

8. The process of claim 5, wherein the cherries formed by the process comprise a moisture content of from about 9% to about 15%.

9. The process of claim 7, wherein the cherries formed by the process comprise a moisture content of from about 9% to about 15%.

10. The process of claim 8, wherein the cherries formed by the process comprise a water activity of from about 0.4 to about 0.6.

11. The process of claim 9, wherein the cherries formed by the process comprise a water activity of from about 0.4 to about 0.6.

12. The process of claim 1, wherein the rinsed cherries are infused for from about 6 to about 15 hours and the process for making a value-added fruit is completed in about one week or less.

13. The process of claim 10, wherein the rinsed cherries are infused for from about 6 to about 15 hours and the process for making a value-added fruit is completed in about one week or less.

14. The process of claim 11, wherein the process for making a value-added fruit product consists of the following steps:
   providing brined cherries;
   freezing the cherries in water for about 12 to about 72 hours;
   rinsing the cherries to remove sulfur to less than 50 ppm;
   infusing the rinsed cherries to from about 45 Brix to about 55 Brix using an
   infusion bath comprising cherry juice; and
   drying the cherries.

15. A process for making a value-added fruit product comprising the steps of:
   providing brined cherries containing sulfur;
   freezing the cherries in a water bath for from about 12 to about 72 hours;
   rinsing the cherries to remove sulfur to less than about 50 ppm;
   coloring and infusing the cherries using a bath, comprising of a red cabbage juice extract and caramel color dissolved in a corn syrup;
   stabilizing the cherries by increasing the Brix of the cherries to not greater than about 52 Brix by adding a combination of corn syrup and lemon juice to the bath;
   pasteurizing the cherries by heating and then cooling the cherries;
   adding a flavorant to the liquid bath as the cherries cool during pasteurization;
   separating the cherries from the liquid bath; and
   freezing the cherries.

16. The process of claim 15, wherein the flavorant comprises a natural black sweet cherry flavor.

17. The process of claim 16, wherein the cherries are pasteurized to a controlled temperature of from about 180° F. to about 200° F. and subsequently cooled to a temperature of from about 80° F. to about 90° F.

18. The process of claim 17, wherein the natural black sweet cherry flavorant is added to the liquid bath while the liquid bath is cooling after pasteurization when the temperature of the liquid bath is not more than about 110° F.

19. A process for making a value-added fruit product comprising the steps of:
   providing brined cherries containing sulfur;
   freezing the cherries for about 12 to about 72 hours to soften the firm tissue of the brined cherries, wherein the freezing temperature is less than or equal to 0° F.;
   rinsing the cherries to remove sulfur to less than about 50 ppm, wherein rinsing comprises soaking the cherries in cold water until the sulfur content of the cherries is less than 50 ppm; and infusing the brined cherries with red tart cherry juice to from about 45 to about 68 Brix wherein infusing comprises:
   soaking the cherries for about 2 hours in a first infusion juice comprising a Brix of about 68;
   separating the cherries from the first infusion juice and soaking the cherries for about 4 hours in a second infusion juice comprising a Brix of about 68;

separating the cherries from the second infusion juice; and
drying the cherries for about 2 hours at a temperature of about 180° F.

20. The process of claim 19, wherein freezing the cherries comprises freezing the cherries in water.

21. A process for converting brined cherries to black sweet cherry products comprising the steps of:
providing brined cherries containing sulfur,
freezing the cherries for about 12 to about 72 hours to soften the firm tissue of the brined cherries;
rinsing the cherries in water to remove sulfur to less than about 50 ppm;
coloring and infusing the cherries with a composition comprising a combination of from about 1% to about 7% of red cabbage juice extract and caramel color, based on the weight of the cherries, dissolved in high fructose corn syrup by placing the cherries and the composition together to form a first bath;
stabilizing the cherries by adding a stabilization syrup comprising a combination of from about 50 to about 80 Brix high fructose corn syrup and about 1% lemon juice, based on the weight of the cherries to the first bath thereby forming a second bath;
pasteurizing the cherries by heating the cherries to about 180° F. to about 200° F. and then cooling the cherries to at least about 100° F.;
adding about 3% natural black sweet cherry flavor, based on the weight of the cherries;
separating the cherries from the second bath wherein the resultant cherries are black sweet cherry products; and
measuring the sulfur content to confirm less than about 10 ppm sulfur in the processed cherries.

22. The process of claim 21 further comprising the step of freezing the processed cherries.

23. The process of claim 21, wherein the cherries are frozen in water prior to coloring and infusing the cherries.

24. The process of claim 21, wherein the brined cherries comprise brined cherries chosen from the group consisting of single bleached whole cherries, double bleached whole cherries, and single bleached sliced cherries, double bleached sliced cherries, or mixtures thereof.

* * * * *

UNITED STATES PATENT AND TRADEMARK OFFICE
CERTIFICATE OF CORRECTION

PATENT NO. : 7,326,432 B2  
APPLICATION NO. : 10/624225  
DATED : February 5, 2008  
INVENTOR(S) : Sinha et al.

Page 1 of 1

It is certified that error appears in the above-identified patent and that said Letters Patent is hereby corrected as shown below:

Column 5, line 38:
 "calorimeter" should be --colorimeter--

Column 6, line 5:
 "calorimeter" should be --colorimeter--

Column 6, line 62:
 "calorimeter" should be --colorimeter--

Column 7, line 22:
 "calorimeter" should be --colorimeter--

Column 8, claim 19, line 61:
 "68" should be --70--

Signed and Sealed this

Seventeenth Day of February, 2009

JOHN DOLL  
*Acting Director of the United States Patent and Trademark Office*